United States Patent
Kubo

(10) Patent No.: US 6,860,813 B2
(45) Date of Patent: Mar. 1, 2005

(54) GAME ETHOD AND SYSTEM FOR INDICATING INPUT DEVICE ORIENTATION RELATIVE TO GAME SPACE

(75) Inventor: Morikuni Kubo, Sibuya-ku (JP)

(73) Assignee: Konami Corporation, Tokyo (JP)

(*) Notice: Subject to any disclaimer, the term of this patent is extended or adjusted under 35 U.S.C. 154(b) by 186 days.

(21) Appl. No.: 10/165,109

(22) Filed: Jun. 6, 2002

(65) Prior Publication Data

US 2002/0187832 A1 Dec. 12, 2002

(30) Foreign Application Priority Data

Jun. 6, 2001 (JP) .................................... 2001-170947

(51) Int. Cl.[7] .................................................. A63F 9/24
(52) U.S. Cl. ........................................ 463/30; 463/43
(58) Field of Search .............................. 463/30–34, 36, 463/43–44; 273/148 B, 148 R; 345/156–158, 161

(56) References Cited

U.S. PATENT DOCUMENTS 5,649,861 A    7/1997  Okano et al.
6,500,069 B1 * 12/2002 Ohba et al. .................... 463/31
6,603,479 B1 *  8/2003 Mifune et al. ................. 463/31

FOREIGN PATENT DOCUMENTS

EP    0714685    6/1996
EP    0844587    5/1998

* cited by examiner

*Primary Examiner*—Mark Sager
(74) *Attorney, Agent, or Firm*—Jordan and Hamburg LLP

(57) ABSTRACT

A game system generates an image from a predetermined viewpoint of a game region and an object for operation by a player on a screen of a display device. A discrimination image of an input device is displayed on the screen. When an image of the game region is changed according to the change of a viewpoint, a correlation between the direction specific to a direction indicating section of the input device and the direction specific to a direction indicating section of the input device and the direction specific to the game region in the screen is constantly maintained irrespective of such the change so that the direction specific to the game region in the screen substantially coincides with the direction specific to the direction indicating section grasped from the discrimination image.

10 Claims, 5 Drawing Sheets

GAME ETHOD AND SYSTEM FOR INDICATING INPUT DEVICE ORIENTATION RELATIVE TO GAME SPACE

BACKGROUND OF THE INVENTION

1. Field of the Invention

The present invention relates to a game system for moving an object on a screen according to an operating direction of a direction indicating section of an input device; and a program for configuring such a game system.

2. Description of the Related Art

In a video game machine for executing a so called board game such as chess, movement of a player's piece on a board face is generally controlled according to an operation relevant to the direction indicating section provided on an input device (controller). At the direction indicating section, an operating section is provided in four directions, i.e., vertical and horizontal directions form a predetermined location as a center, alternatively, in eight directions in which diagonal line directions thereof are added. As a typical example of such a direction indicating section, there is one provided an operating member so called a cross shaped key. Alternatively, there is another example in which a push button type operating member is located vertically and horizontally to function as one direction indicating section.

In the meantime, there is a specific direction on a game board face displayed on a game screen, alternatively, a specific direction at a direction indicating section of an input device. A predetermined correlation is defined between the direction specific to the direction indicating section and the direction specific to the game board face. In general, the correlation is defined so that the direction specific to the game board face displayed on a screen and the operating direction of the direction indicating section coincide with each other. For example, where the game board face is displayed so that, on the screen, the player's side is located at the lower side, and the counterpart's side is located at the upper side, the direction indicating section is operated in an upper direction from the viewpoint of the player, whereby the player's owned piece advances at the upper side of the screen, namely, toward the counterpart's side.

In a board game such as chess executed on a conventional video game machine, its board face is configured comparatively simply, and an image of such a game board face is limited to a still picture on which the game board face is scanned from a predetermined viewpoint (for example, a right above viewpoint) However, with improvement of the three-dimensional image processing capability of the game machine, in a game of such type as well, it has become general that a game board face and objects such as pieces located on the game board are depicted by a using three-dimensional computer graphics. In the case where a game board face is depicted as a three-dimensional image, it is possible to change a viewpoint, and then, present images of the game board face in a variety of directions.

However, in the case where an image of the game board face is changed according to a change of viewpoint, a correlation between the direction specific to the screen and the direction specific to the game board face are also changed together with such a change. For example, where the upper direction of the screen coincides with the piece advancing direction before change of the viewpoint, there occurs a change, for example, the game board face rotates on the screen together with the change of viewpoint, whereby the right oblique upper direction of the screen coincides with the piece advancing direction. Even in the case where such a change occurs, when a correlation between the direction specific to the game board face and the direction specific to the direction indicating section provided on the input device is constantly maintained, a correlation between the piece moving direction on the game board face and the operating direction of the direction indicating section becomes constant irrespective of the orientation in the screen of the game board face. For example, in the case where an operation in the upper direction of the direction indicating section is associated with the piece advancing direction, the player operates the direction indicating section in the upper direction when the piece is advanced irrespective of whether the piece advancing direction on the game board face is in the upper direction of the screen or in the right oblique upper direction.

However, in a home use video game machine, the player often operates an input device while holding it in a predetermined direction. Specifically, the player of ten holds the input device in a posture in which the vertical and horizontal directions on the screen and that of the direction indicating section substantially coincide with each other. Therefore, when the direction specific to the screen and the direction specific to the game face dose not coincide, there is a possibility that the player may get confused relevant to the operation of the direction indicating section. For example, in the case where the right oblique upper direction of the screen coincides with the piece advancing direction, there is a possibility that the player cannot discriminate immediately to operate the direction indicating section in the upper direction or right direction from the player's view in order to advance the piece.

SUMMARY OF THE INVENTION

The present invention has been achieved in order to solve the above problems. It is an object of the present invention to provide a game system in which, even in the case where the orientation of a game region displayed on a screen has been changed together with a change of viewpoint, a player can easily discriminate a correlation between a direction specific to a direction indicating section of an input device and a direction specific to a game region and a game program for realizing the game system thereof.

Hereinafter, the present invention will be explained.

In order to solve the above described problem, according to one aspect of the present invention, there is provided a game system for generating an image where a game region located in a virtual three-dimensional space and an object targeted for operation of a player located in the game region are scanned from a predetermined viewpoint, thereby displaying the image on a screen of a display device, and then, in response to operation of the player relevant to a direction indicating section of an input device, controlling a location of the object so that the object moves in a direction on the game region that corresponds to an operating direction of the direction indicating section, the game system comprising: viewpoint switching device for changing the viewpoint in the virtual three-dimensional space, thereby changing an image of the game region displayed on the screen; and a discrimination image presenting device for displaying on the screen a discrimination image visually associated with the direction indicating section an extent such that a direction specific to the direction indicating section of the input device can be grasped, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section grasped from the discrimination image substantially coincide with each other.

According to the above aspect of the game system of the present invention, the player can grasp the direction specific to the direction indicating section from the discrimination image displayed on the screen. Moreover, the orientation of the discrimination image changes together with a change of viewpoint so that the direction that can be grasped from that discrimination image and the direction specific to the image in the game region substantially coincide with each other. Therefore, the player can easily recognize a correlation between the direction specific to the actual direction indicating section and the direction specific to the image in the game region by means of the discrimination image, and can operate the direction indicating section properly.

In order to solve the above described problem, according to another aspect of the present invention, there is provided a game program for generating an image where a game region located in a virtual three-dimensional space and an object targeted for operation of a player located in the game region are scanned from a predetermined viewpoint, thereby displaying the image on a screen of a display device, and then, in response to operation of the player relevant to a direction indicating section of an input device, controlling a location of the object so that the object moves in a direction on the game region that corresponds to an operating location of the direction indicating section on a computer as a game system, wherein the game program causes the computer to function as: a viewpoint switching device for changing the viewpoint in the virtual three-dimensional space, thereby changing an image of the game region displayed on the screen; and a discrimination image presenting device for displaying on the screen a discrimination image visually associated with the direction indicating section to an extent such that a direction specific to the direction indicating section of the input device can be grasped, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section grasped from the discrimination image substantially coincide with each other.

This game program is executed at a computer, thereby making it possible to function the computer as a game system of the present invention.

In the present invention, the discrimination image presenting device may display an image that contains an appearance of the direction indicating section of the input device as the discrimination image. In this case, the orientation of an image of the direction indicating section displayed on the screen changes according to a viewpoint so that the player can easily grasp a correlation between the direction specific to the direction indicating section and the direction specific to the game region.

The discrimination image presenting device may display an image simulating an appearance of the input device as the discrimination image. In this case, an image of the input device itself is displayed on a screen, and moreover, that image changes the orientation in the screen according to a change of image in the game region together with a change of viewpoint. Therefore, the player can grasp a correlation between the direction specific to the direction indicating section and the direction specific to the game region more easily.

The discrimination image presenting device specifies a rotation angle of the game region around the vertical axis in the viewpoint coordinate system for the virtual three-dimensional space, thereby changing a tilt of the discrimination image around the longitudinal axis in the viewpoint coordinate system according to the rotation angle. In this manner, the discrimination image can be tilted to be associated with rotation of the game region in the screen.

The player's side and the counterpart's side are set in the game region, whereby the direction specific to the game region may be set to be associated with each of the sides. In this case, the player can easily grasp a correlation between each side of the game region and the operating direction of the direction indicating section.

The game region is segmented in the lattice shape from the viewpoint of the player's side, whereby a number of frames may be provided. In this case, the player can easily grasp a correlation between the player's side and the counterpart's side in a type of board game and a correlation between the piece moving direction and the operating direction of the direction indicating section.

A program of the present invention may be provided to a user while the program is recorded in a storage medium, alternatively, may be distributed to the user through a wired or wireless network.

DESCRIPTION OF THE PREFERRED EMBODIMENTS

Figure 1:
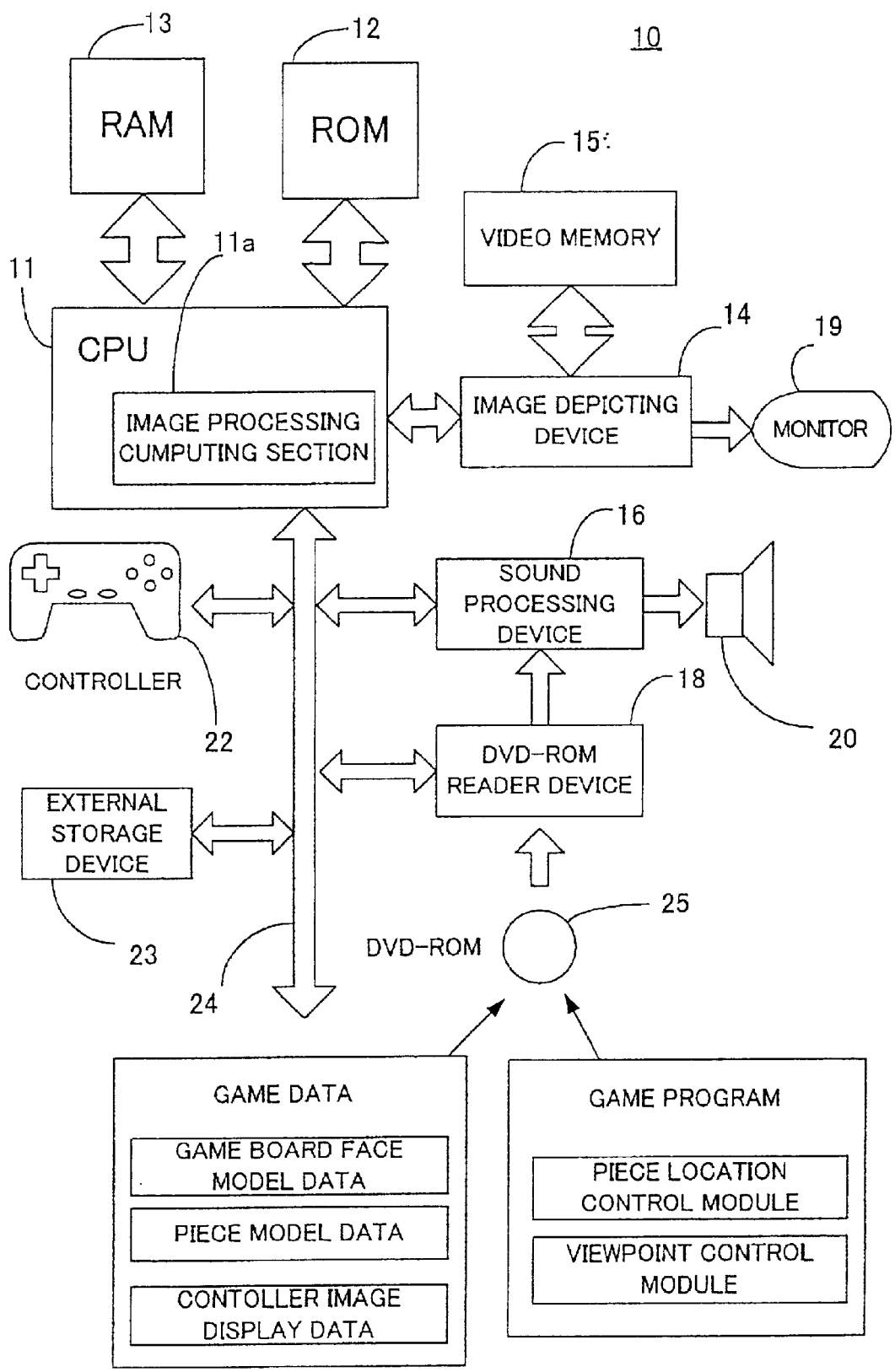
FIG. 1 is a block diagram showing a video game machine represented as one embodiment of a game system according to the present invention.

FIG. 1 is a block diagram showing a home use video game machine according to one embodiment of the present invention. A game machine 10 is configured as a computer for executing a predetermined game in accordance with a game program recorded in a storage medium (for example, DVD-ROM) 25. The game machine 10 has: a CPU 11 primarily configured with a microprocessor; a ROM 12 and a RAM 13 as a main memory for the CPU 11; an image depicting device 14 and a sound processing unit 16 for carrying out processing suitable to image processing and voice processing based on an instruction from the CPU 11; and a DVD- ROM reader device 18 for reading a program and data from a DVD-ROM 25 as a storage medium. An operating system as a program required for entire operation control of the game machine 10 is written into the ROM 12. A program and data read from the DVD-ROM 25 serving as a storage medium are written as required in the RAM 13.

At the inside of the CPU 11, apart from a main core unit for carrying out a variety of computing processes, there is provided an image processing computing section 11a for carrying out geometry processing such as polygon coordinate conversion or vector computation in so called three-dimensional computer graphics. This image processing computing section 11a is configured in combination with a microprocessor and specific software, for example.

On the other hand, the image depicting device 14 executes a so called rendering process for receiving polygon data or the like from the CPU 11 and depicting an image on a video memory 15. In addition, the image depicting device 14 generates a video reproducing signal that configures one frame based on image data rendered in the video memory 15, and outputs the video reproducing signal to a monitor 19 at a predetermined timing.

Incidentally, in FIG. 1, although the video memory 15 is provided as a memory for use in depicting only corresponding to the image depicting device 14, a video memory may be allocated on the RAM 13 as a main memory. In addition, what process is shared by the CPU 11 and the image depicting device 14 respectively differs depending on their hardware configuration, and the present invention is not limited to the above configuration.

The sound processing unit 16 reproduces data such as voice or music read out from the DVD-ROM 25 or sound source data or the like, and outputs it from a speaker 20. The reader device 18 reads the program or data recorded on the DVD-ROM 25 in accordance with an instruction from the CPU 11, and outputs a signal that corresponds to the read contents.

Further, a controller (input device) 22 and an external storage device 23 are connected respectively to the CPU 11 via a bus 24. The external storage device 23 is provided as a storage device capable of renewal such as a nonvolatile semiconductor memory, a hard disk, a magneto-optical disk or the like.

Figure 2:
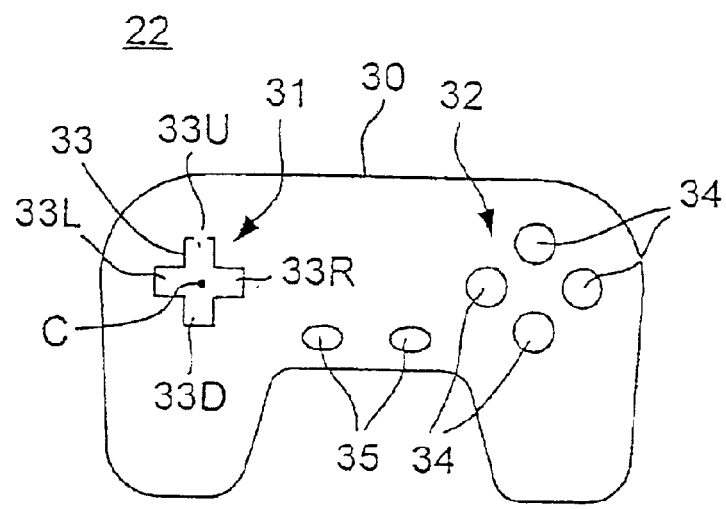
FIG. 2 is a front view showing an input device for use in the game machine of FIG. 1.

As shown in FIG. 2 in detail, the controller 22 has a portable mainframe 30, a direction indicating section 31, and a command input section 32. A cross shaped key 33 is provided at the direction indicating section 31. An upper end section 33U, a lower end section 33d, a right end section 33R, and a left end section 33L relevant to a center C of the key 33 function as an operating section capable of making push-in operation respectively. The direction specific to the direction indicating section 31 is defined in accordance with the upper end section 33U, lower end section 33D, right end section 33R, and left end section 33L relevant to the key center C. That is, the side of the upper end section 33U from the key center C corresponds to the upper direction; the side of the lower end 33D from the key center C corresponds to the lower direction; the side of the right end section 33R from the key center C corresponds to the right direction; and the side of the left end section 33L from the key center corresponds to the left direction, respectively.

The configurations shown in FIG. 1 and FIG. 2 are provided as an example, and a configuration of a computer to which the present invention is applied may be properly changed. The connection mode of each device relevant to the CPU 11 is not limited to FIG. 1.

A game program recorded in the DVD-ROM 25 as a storage medium executes a predetermined game in accordance with the present invention. In addition, various game data required for execution of the game program are recorded in the DVD-ROM 25. Since a mode in which a type of board game moving a piece on the game board face is executed is displayed on the screen of the monitor 19 as a three-dimensional image, the data on the game board face model 2 shown in FIG. 3 and the data on the piece model 3 are recorded as game data in the DVD-ROM 25. Further, the game data contains also controller image display data for displaying the image of the controller 22 on the screen of the monitor 19.

Figure 3:
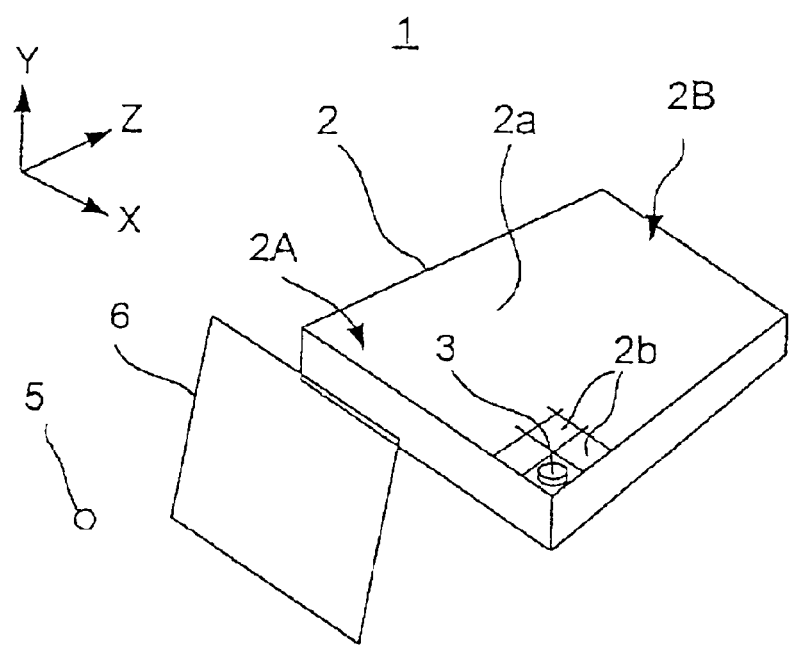
FIG. 3 is a view showing a state in which a game board face model and a piece model are located in a virtual three-dimensional space, and a scene is constructed in order to form an image of a game board face.

FIG. 3 shows a state in which the game board face model 2 and piece model 3 specified based on the data on the game board face model and piece model are located in the virtual three-dimensional space 1. The game board face model 2 has a game board face 2a, which is almost rectangular shaped, as a game region. The board face 2a is segmented in the lattice shape so that a number of frames 2b . . . 2b (only some frames of them are displayed in FIG. 3) are generated. The game board face 2a extends in a horizontal direction in the virtual three-dimensional space 1.

In addition, both ends of the game board face 2a are set as a player's side 2A and a counterpart's side 2B, respectively. The direction specific to the game board face 2a is set to be associated with these sides 2A and 2B. Here, a description is continued assuming that: the direction oriented to the counterpart side 2B from the viewpoint of the player's side 2A corresponds to the front of the game board face 2a; the direction returning to the player's side 2A corresponds to the rear of the game board face 2a; the right hand side when the counterpart's side 2B is seen from the player's side 2A corresponds to the right of the game board face 2a; the left hand side when the counterpart's side 2B is seen from the player's side 2A corresponds to the left of the game board face 2a, respectively.

The piece model 3 is assigned at least one by one, respectively, to the player and the counterpart. FIG. 3 shows only one piece model 3. At least one piece model 3 assigned to the player is set as an object targeted for the player to operate via the controller 22.

When information concerning the location and shape of models 2 and 3 each located in the virtual three-dimensional space 1 and these scanning conditions (such as the location of a viewpoint or a virtual screen 6 on which models 2 and 3 are projected or the scanning image angle from the viewpoint 5, for example) are assigned, the image processing computing section 11a and image depicting device 14 configured in the CPU 11 of the game machine 10 carries out computation required for generating images 40 and 41 (refer to FIG. 5) obtained by projecting the models 2 and 3 from the viewpoint 5 in accordance with these information and scanning conditions on the virtual screen 6, and depicts the image projected on the virtual screen 6 on the video memory 15. In a home video game machine or a comparatively inexpensive personal-use computer such as a personal computer as well, a program for carrying out such three-dimensional image processing is widely mounted as a basic processing function of a video driver for controlling an operating system or an image depicting device 14. A detailed description of processing achieved by such a program is omitted here.

On the other hand, the controller image display data shown as one type of game data in the DVD-ROM 25 of FIG. 1, as shown in FIG. 5, for example, is provided to display an image 42 simulating an appearance of the controller 22 in proximity (upper part in the figure) to the image 40 of the game board face 2a. The image 42 of the controller 22 may be generated by configuring the controller 22 as a three-dimensional model to locate the model in the virtual three-dimensional space 1, and then, projecting from the viewpoint 5 on the virtual screen 6. Alternatively, after the image of the controller 22 is configured as two-dimensional image data, and transparent conversion of the three-dimensional model into the virtual screen 6 terminates, the image data may be depicted on the video memory 15 to be superimposed on these transparently converted model image.

In the game program recorded in the DVD-ROM 25, when a predetermined condition is met (for example, when the player's turn comes in a game in which such turn comes in turn between the player and the counterpart), a piece location control module for controlling the location of the piece model 3 is included so as to move the piece model 3 in the direction on the game board face 2a according to the operating direction of the direction indicating section 31 of the controller 22. In addition, in the game program, a progress in game is changed according to the location of the piece model 3. For example, when the player's piece model 3 and the counterpart's piece model 3 are in a predetermined location relationship, fighting between them is started, and an event or the like is generated according to the location of the piece model 3. Such processing according to the location of the piece model 3 may be properly defined.

Further, a viewpoint control module for changing the images 40 to 42 (FIG. 5) of the game board face model 2, piece model 3, and controller 22 displayed on the monitor 19 by changing the viewpoint 5 is provided for the game program recorded in the DVD-ROM 25.

Figure 4:
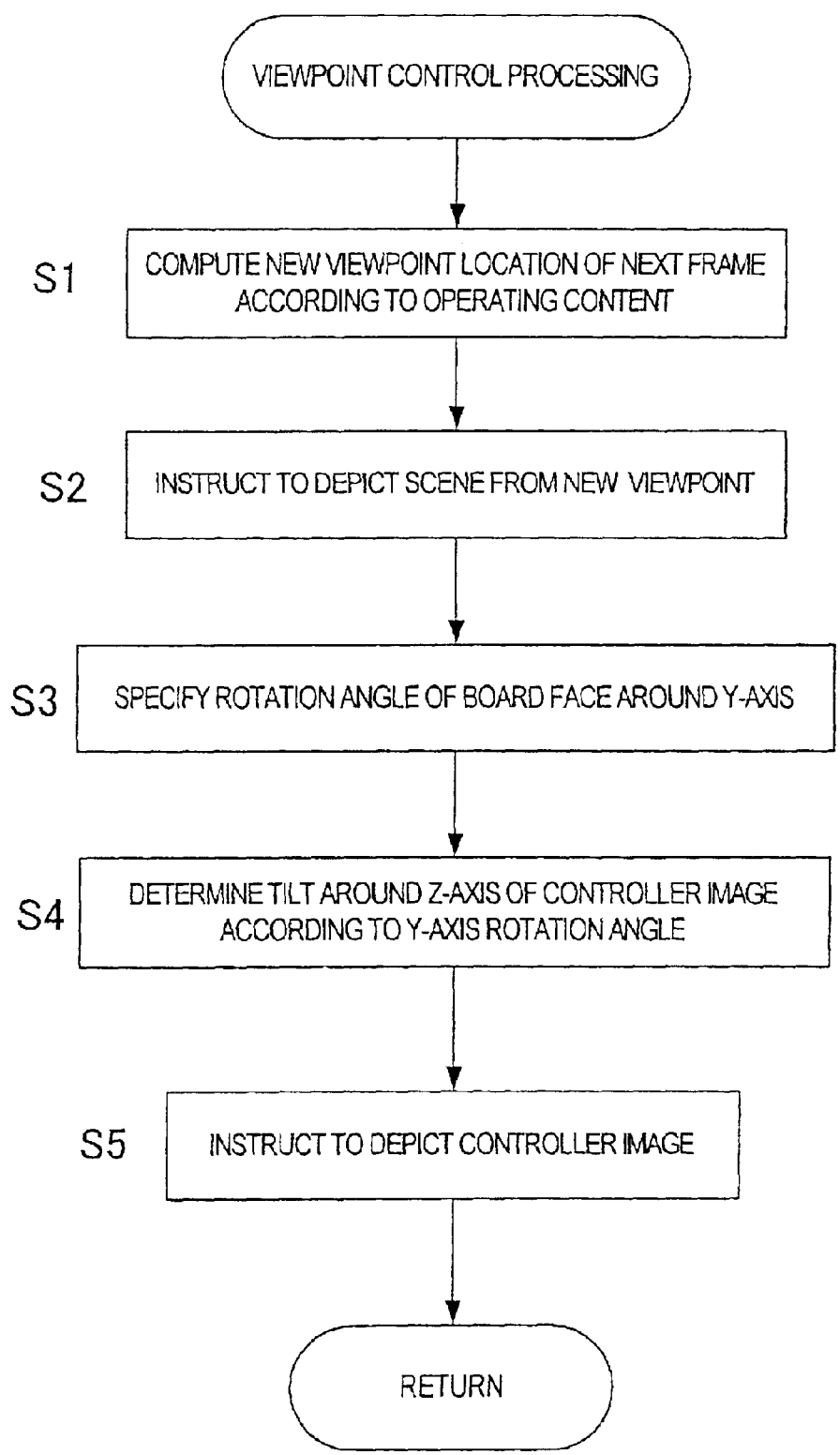
FIG. 4 is a flow chart showing a viewpoint control process executed by the game machine of FIG. 1.

FIG. 4 is a flow chart showing procedures for viewpoint control processing executed by the CPU 11 in accordance with the viewpoint control module. This viewpoint control processing is executed when the player does the predetermined viewpoint change operation for the controller 22. At the first step S1, the location of a new viewpoint 5 is computed in the virtual three-dimensional space 1 according to the content of the viewpoint change operation. Then, an instruction is assigned to the image processing computing section 11a and image depicting device 14 so as to depict on the video memory 15 an image obtained by scanning a scene of the virtual three-dimensional space 1 from the new viewpoint 5 (step S2).

Next, a rotation angle produced with a change of the viewpoint 5 of the game board face 2a concerning a Y-axis of the viewpoint coordinate system X-Y-Z (refer to FIG. 1) is specified (step S3). The viewpoint coordinate system is provided as a three-axis orthogonal coordinate system in which Z-axis is set in the scanning direction from the viewpoint 5 (in the longitudinal axis direction), Y-axis is set in the direction vertically orthogonal to the Z-axis, and X-axis is set in the direction transversely orthogonal to the Z-axis, respectively. In the virtual three-dimensional space 1, the game board face 2a is fixed, and the viewpoint 5 moves around it, whereby the fact is observed the game board face 2a looks like rotating on the screen of the monitor 19. Therefore, the rotation quantity of the game board face 2a on the screen is specified as a rotation angle of the game board face 2a around the Y-axis on the basis of the viewpoint coordinate system.

Figure 5A:
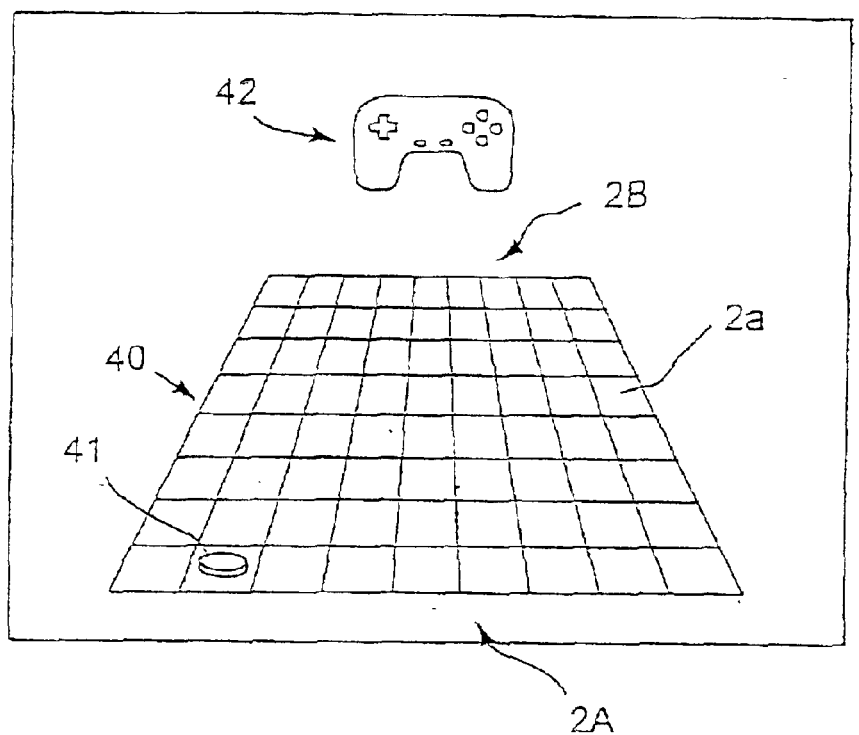
FIGS. 5A and 5B are views showing examples of a screen displayed by the process of FIG. 4.
Figure 5B:
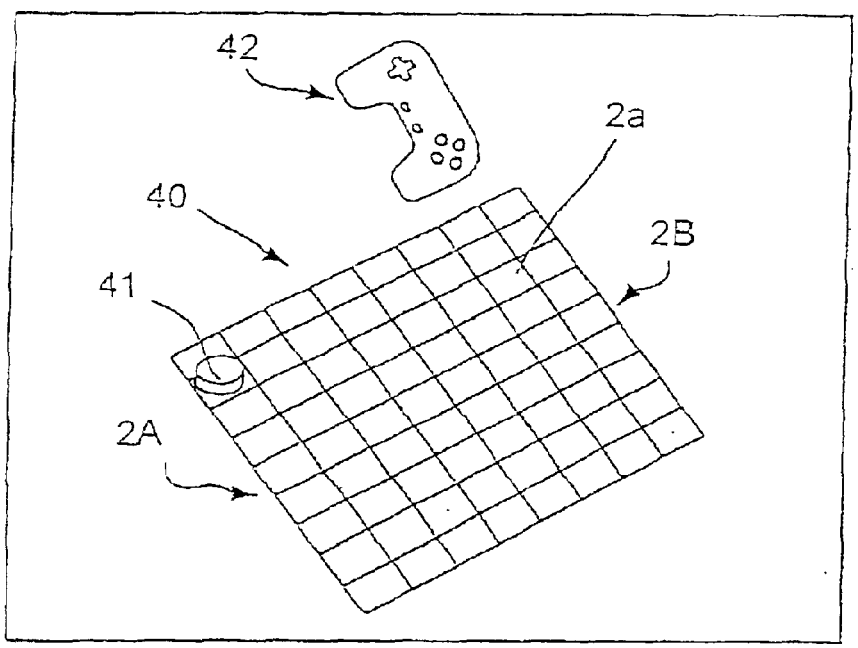

Next, the tilt around the Z-axis of the controller image 42 is determined according to the rotation angle in the specified Y-axis direction (step S4). The Z-axis direction in the viewpoint coordinate system coincides with the scanning direction. Thus, the tilt in the Z-axis direction of the controller image 42 is changed, whereby the controller image 42 rotates around the axis orthogonal to the screen, as shown in FIGS. 5A and FIG. 5B. A relationship between rotation of the image 40 on the game board face 2a and the tilt of the controller image 42 is defined so that the direction specific to the game board face 2a grasped through the image 40 substantially coincides with the direction specific to the direction indicating section 31 of the controller 22 grasped through the controller image 42. For example, as shown in FIG. 5A, when the image 40 is displayed in an orientation in which the longitudinal direction of the game board face 2a coincides with the vertical direction on the screen, the controller image 42 as well is displayed in an orientation in which the vertical direction of the direction indicating section 31 coincides with the vertical direction of the screen. In contrast, as shown in FIG. 5B, when the game board face 2a rotates to be tilted at the right side, the controller image 42 as well is tilted at the right side together with such rotation. The tilt of the controller image 42 is thus changed together with rotation of the game board face 2a on the screen so that the player can grasp intuitively a correlation through the controller image 42 between the operating direction of the direction indicating section 31 and the longitudinal and transverse directions of the game board face 2a each. In particular, the orientation of the controller 22 itself is changed together with the controller image 42, whereby a correlation between the operating direction of the direction indicating section 31 and the direction of the game board face 2a in the screen can be easily and certainly grasped, which is convenient.

When a tilt of the controller image 42 is determined, an instruction is assigned to the image processing computing section 11a and image depicting device 14, alternatively, the image depicting device 14 so as to depict the controller image 42 in accordance with such a tilt (step S5). Then, the processing of FIG. 4 terminates.

The present invention is not limited to the above embodiment. For example, the change of the viewpoint 5 may be automatically switched according to a game state without depending on a viewpoint switching operation to the controller 22. A discrimination image may be produced as an image visually associated with the direction indicating section 31 to an extend such that the direction specific to the direction indicating section 31 of the controller 22 can be grasped without being limited to an image simulating the entire appearance of the controller 22. For example, a partial image containing the direction indicating section 31 of the controller 22 maybe displayed as a discrimination image. When the direction indicating section 31 itself has an appearance for discriminating the operating direction, for example, when an operating member of the direction indicating section 31 is colored according to the operating direction, or when it has a different shape according to the operating direction, or the like, an image simulating only the appearance of the direction indicating section 31 may be displayed as a discrimination image. The game board face may be expressed as various embodiments, not being limited to the embodiment showed in the drawings. For example, a variety of game regions can be targeted without being limited to the game board face divided by frames. The game board face may be expressed as a ground or water level and the like, alternatively, may be elevated or tilted. Objects targeted for the player's operation may be expressed as characters or cards or the like not being limited to the pieces.

A correlation between the direction specific to the direction indicating section of the input device and the direction specific to the game region in the screen is not required to always maintain constantly. Even in a game system in which such a correlation changes when a specific condition is met as well, the present invention can be applied as long as the game region moves in the screen in a state in which the correlation is constantly maintained. The direction indicating section of the input device is not limited to that having a cross shaped operating member, and is included in a concept of the direction indicating section as long as it is used for indicating any direction in a game.

Figure 6:
FIG. 6 is a view showing an example of a screen of a video game actually configured by the inventors according to the present invention.

FIG. 6 shows an example of the screen for a video game actually configured by the inventors, in accordance with the present invention. In this example, an image simulating the controller of the home use video game machine is displayed under the numerical value indicated as "98" at the upper center of the screen.

As has been described above, according to the present invention, the player can grasp the direction specific to the direction indicating section from the discrimination image displayed on the screen. Moreover, the orientation of the discrimination image changes together with the change of viewpoint so that the direction that can be grasped from the discrimination image substantially coincides with the direction specific to the image in the game region. Therefore, by means of the discrimination image, the player can easily recognize a correlation between the direction specific to the actual direction indicating section and the direction specific to the image in the game region and can operate the direction indicating section properly.

What is claimed is:

1. A game system for generating an image of a game region located in a virtual three-dimensional space and an object to be operated by a player located in the game region on a screen of a display device from a predetermined viewpoint, and then, in response to operation of the player of a direction indicating section of an input device, controlling a location of the object so that the object moves in a direction on the game region that corresponds to an operating direction of the direction indicating section, the game system comprising:

a viewpoint switching device for changing the viewpoint in the virtual three-dimensional space, thereby changing an image of the game region displayed on the screen; and a discrimination image presenting device for displaying on the screen a discrimination image that contains an appearance of the direction indicating section of the input device, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section discernable from the discrimination image substantially coincide with each other.

2. The game system according to claim 1, wherein the discrimination image presenting device specifies a rotation angle of the game region around a vertical axis in a viewpoint coordinate system for the virtual three-dimensional space, and changes a tilt of the discrimination image around a longitudinal axis in the viewpoint coordinate system according to the rotation angle.

3. The game system according to claim 1, wherein a player's side and a counterpart's side thereof are set in the game region, and the direction specific to the game region is set to be associated with each of the sides.

4. The game system according to claim 3, wherein the game region is segmented in a lattice shape from the viewpoint of the player's side to provide a number of frames.

5. A game system for generating an image of a game region located in a virtual three-dimensional space and an object to be operated by a player located in the game region on a screen of a display device from a predetermined viewpoint, and then, in response to operation of the player of a direction indicating section of an input device, controlling a location of the object so that the object moves in a direction on the game region that corresponds to an operating direction of the direction indicating section, the game system comprising:

a viewpoint switching device for changing the viewpoint in the virtual three-dimensional space, thereby changing an image of the game region displayed on the screen; and a discrimination image presenting device for displaying on the screen a discrimination image that contains an appearance of the input device as the discrimination image, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section discernable from the discrimination image substantially coincide with each other.

6. A computer readable storage medium including an executable game program for generating an image of a game region located in a virtual three-dimensional space and an object to be operated by a player located in the game region on a screen of a display device from a predetermined viewpoint, and then, in response to operation of the player of a direction indicating section of an input device, controlling a location of the object so that the object moves in a direction on the game region that corresponds to an operating direction of the direction indicating section on a computer as a game system, wherein the game program causes the computer to function as:

a viewpoint switching device for changing the viewpoint in the virtual three-dimensional space, thereby changing an image of the game region displayed on the screen; and a discrimination image presenting device for displaying on the screen a discrimination image that contains an appearance of the direction indicating section of the input device, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section discernable from the discrimination image substantially coincide with each other.

7. The computer readable storage medium according to claim 6, wherein the discrimination image presenting device specifies a rotation angle of the game region around a vertical axis in a viewpoint coordinate system for the virtual three-dimensional space, and changes a tilt of the discrimination image around a longitudinal axis in the viewpoint coordinate system according to the rotation angle.

8. The computer readable storage medium according to claim 6, wherein a player's side and counterpart's side thereof are set in the game region, and the direction specific to the game region is set to be associated with each of the sides.

9. The computer readable storage medium according to claim 8, wherein the game region is segmented in a lattice shape from the viewpoint of the player's side to provide a number of frames.

10. A computer readable storage medium including an executable game program for generating an image of a game region located in a virtual three-dimensional space and an object to be operated by a player located in the game region on a screen of a display device from a predetermined viewpoint, and then, in response to operation of the player of a direction indicating section of an input device, controlling a location of the object so that the object moves in a direction on the game region that corresponds to an operating direction of the direction indicating section on a computer as a game system, wherein the game program causes the computer to function as:

a viewpoint switching device for changing the viewpoint in the virtual three-dimensional space, thereby changing an image of the game region displayed on the screen; and a discrimination image presenting device for displaying on the screen a discrimination image that contains an appearance of the input device as the discrimination image, and in the case where a correlation between a direction specific to the direction indicating section of the input device and a direction specific to the game region in the screen is constantly maintained irrespective of a change of an image in the game region together with a change of the viewpoint, changing an orientation in the screen of the discrimination image in accordance with a change of the image in the game region so that the direction specific to the game region in the screen and the direction specific to the direction indicating section discernable from the discrimination image substantially coincide with each other.

* * * * *